United States Patent
Saavedra et al.

(10) Patent No.: US 10,541,932 B2
(45) Date of Patent: Jan. 21, 2020

(54) METHOD OF TRANSMITTING DATA BETWEEN A SOURCE NODE AND DESTINATION NODE

(71) Applicant: National University of Ireland, Maynooth, Maynooth (IE)

(72) Inventors: Andrés Garcia Saavedra, Dublin (IE); Mohammad Karzand, Dublin (IE); Douglas Leith, Dublin (IE)

(73) Assignee: National University of Ireland, Maynooth, Maynooth (IE)

( * ) Notice: Subject to any disclaimer, the term of this patent is extended or adjusted under 35 U.S.C. 154(b) by 142 days.

(21) Appl. No.: 15/674,021

(22) Filed: Aug. 10, 2017

(65) Prior Publication Data
US 2018/0026900 A1    Jan. 25, 2018

Related U.S. Application Data

(63) Continuation of application No. PCT/EP2016/050927, filed on Jan. 18, 2016.

(30) Foreign Application Priority Data

Feb. 11, 2015  (GB) .................... 1502257.7

(51) Int. Cl.
| | | |
|---|---|---|
| *H04W 4/00* | (2018.01) | |
| *H04L 12/841* | (2013.01) | |
| *H04L 12/891* | (2013.01) | |
| *H04L 12/803* | (2013.01) | |
| *H04L 12/801* | (2013.01) | |
| *H04L 12/875* | (2013.01) | |

(52) U.S. Cl.
CPC .......... *H04L 47/283* (2013.01); *H04L 47/125* (2013.01); *H04L 47/15* (2013.01);
(Continued)

(58) Field of Classification Search
CPC . H04L 1/1841; H04L 12/5602; H04L 12/801; H04L 12/803; H04L 12/841;
(Continued)

(56) References Cited

U.S. PATENT DOCUMENTS

| | | | | |
|---|---|---|---|---|
| 7,929,527 B2* | 4/2011 | Ramakrishnan | ........ | H04L 69/40 370/389 |
| 8,780,693 B2* | 7/2014 | Kim | ........................ | G06F 15/16 370/216 |

(Continued)

FOREIGN PATENT DOCUMENTS

| | | |
|---|---|---|
| CN | 103401178 A | 11/2013 |
| WO | WO 2013/182122 A1 | 12/2013 |

OTHER PUBLICATIONS

Cloud et al, In-Order Delivery Delay of Transport Layer Coding, arXiv, 9 pages, Aug. 2014.*

(Continued)

*Primary Examiner* — Frank Duong
(74) *Attorney, Agent, or Firm* — Daly, Crowley, Mofford & Durkee LLP

(57) ABSTRACT

A method is disclosed for transmitting data between a source node and destination node connected via multiple paths of a heterogeneous network, at least one of the paths delivering packets with a non-deterministic delivery time. Data is divided into frames, each frame comprising a number of packets, where processing by the destination node of an information packet p is conditional on receipt of the data for any information packet i where i<p. A number of sequential transmission slots s, each for transmitting a given packet p of a frame, are allocated for each network path k. A set D of possible assignments of packets to transmission slots for a frame are provided. The method comprises determining an assignment x with minimum in-order delivery delay of said packets based on expected arrival times of packets to their (Continued)

destination and expected reordering delay for packets. Packets are then transmitted in accordance with the determined assignment x.

28 Claims, 4 Drawing Sheets

(52) U.S. Cl.
CPC .............. *H04L 47/41* (2013.01); *H04L 47/56* (2013.01); *H04L 47/12* (2013.01); *Y02D 50/30* (2018.01)

(58) Field of Classification Search
CPC . H04L 12/875; H04L 12/891; H04L 29/0653; H04L 47/10; H04L 47/12; H04L 47/125; H04L 47/15; H04L 47/27; H04L 47/283; H04L 47/30; H04L 47/32; H04L 47/34; H04L 47/35; H04L 47/41; H04L 47/56; H04L 49/9057; H04L 2012/5635; H04L 2012/5652
See application file for complete search history.

(56) References Cited

U.S. PATENT DOCUMENTS

| | | | |
|---|---|---|---|
| 9,455,897 B2* | 9/2016 | Krishnaswamy | ....... H04L 45/00 |
| 10,143,001 B2* | 11/2018 | Schliwa-Bertling | .... H04L 69/14 |
| 10,243,692 B2 | 3/2019 | Saavedra et al. | |
| 2004/0184449 A1 | 9/2004 | Sreejith et al. | |

OTHER PUBLICATIONS

Latif et al, An Investigation of Scheduling and Packet Reordering Algorithms for Bandwidth Aggregation in Heterogeneous Wireless Networks, Middle-East Journal of Scientific Research 18 (9), 11 pages, 2013.*
Leith et al, Low Delay Random Linear Coding and Scheduling Over Multiple Interfaces, arXiv, 12 pages, Jul. 2015.*
Prabhavat, A Study on Traffic Distribution Models over Multipath Networks, Dissertation, Tohoku University, 111 pages, Jan. 2011.*
PCT Search Report of the ISA for PCT Appl. No. PCT/EP2016/050927 dated May 9, 2016; 5 pages.
PCT Written Opinion of the ISA for PCT Appl. No. PCT/EP2016/050927 dated May 9, 2016; 6 pages.

* cited by examiner

METHOD OF TRANSMITTING DATA BETWEEN A SOURCE NODE AND DESTINATION NODE

CROSS REFERENCE TO RELATED APPLICATIONS

This application is a continuation of and claims the benefit of PCT application PCT/US2016/050927 filed in the English language on Jan. 18, 2016, and entitled "A METHOD OF TRANSMITTING DATA BETWEEN A SOURCE NODE AND DESTINATION NODE," which claims priority to GB 1502257.7 filed Feb. 11, 2015, which application is hereby incorporated herein by reference.

FIELD

The present invention relates to a method of transmitting data between a source node and destination node connected via multiple paths of a heterogeneous network.

BACKGROUND

Transmitting data between a source node and destination node along multiple paths of a network is well-recognised, at least in principle, as an effective technique to improve performance (reduce delay, increase throughput etc.) and resilience (if one path breaks, the connection can gracefully failover to the remaining paths).

Such source and destination nodes would typically comprise a number of network interfaces, each using different technologies to access the Internet such as cellular networks or fixed access networks as well as wired or wireless local access networks. These technologies exhibit different quality characteristics in terms of coverage, capacity, power consumption, geographical availability and cost.

Building an efficient, practically usable multi-path transfer mechanism remains highly challenging. One major issue is packet re-ordering. Referring to FIG. 1, when a source (sender) node stripes packets across multiple paths such as a slow path and a fast path as shown in FIG. 1, differences in transmission delay of the paths means that packets can arrive in a different order from which they were sent.

Thus, in the example, an application running on a destination node has received packets 1 and 2. However, in common with many applications, the application in FIG. 1 requires in-order packet delivery at the destination (receiver). Thus, the application cannot process any of received packets 4-6 until packet 3 has been received.

Note that transmission delay along a path can easily vary rapidly by a factor of 2 or more due to queueing and congestion. So where packet 3, either knowingly or unexpectedly, has been transmitted through the slow path, i.e. where it has incurred a transmission delay, this in turn imposes a re-ordering delay on the processing of packets 4-6 while they are held in a re-ordering buffer.

Re-ordering can translate into increased delay, perhaps greatly increased delay for an application. This issue is greatly exacerbated by any unpredictable, time-varying nature of the transmission delay as well as packet loss rate on each path.

Clearly, if the transmission delay of each path were fixed and known i.e. deterministic, it would be possible to schedule the transmission of packets across each of the paths between a source and destination node so that packets would arrive in-order and so no re-ordering delay would be incurred. However, where transmission delay is not certain, because of the stochastic nature of the underlying network paths, then a problem arises in scheduling packets for transmission across different paths with a minimum of re-ordering delay.

FIG. 2 illustrates why failure to consider the randomness of the delays inherent to real-life communication paths when scheduling transmission of packets may lead to re-ordering delays. In this example, two packets 1, 2 have to be scheduled across two paths/links or interfaces with identical average one-way delay. A deterministic scheduler that only considers the expectation of the paths' delays may schedule packet 1 in a high variance or volatile path, forcing packet 2 to await in the receiver's buffer for packet 1 during slower transmission times for packet 1, thus growing the expected re-ordering delay.

At larger scales, when many paths and/or packets are to be scheduled, a deterministic scheduler could lead to high re-ordering delays, particularly when some paths have large variances.

Previous work on multi-path packet transmission has considered joint congestion control across the paths including: joint control of the rate at which packets are sent for example, as disclosed in EP2537301 and U.S. Pat. No. 8,780,693; use of multiple paths for load balancing, as disclosed in U.S. Pat. No. 8,036,226; mobility when using multiple paths and multi-path connection establishment as disclosed in U.S. Pat. No. 8,824,480; selection of which interface from the available interfaces on which to route a flow as disclosed in U.S. Pat. No. 7,230,921; and selection of the path along which to send feedback reports from the receiver as disclosed in US2013/0077501.

However, these have not addressed the problem outlined above in handling the scheduling of packets which are to be transmitted over multiple network paths exhibiting non-deterministic transmission delays.

SUMMARY

According to a first aspect of the present invention, there is provided a method of transmitting data between a source node and destination node.

Embodiments of this method provide a technique for selecting on which path to schedule transmission of information packets, minimizing the expected in-order delivery delay, taking due account of the uncertain, time-varying nature of the delay on each path.

According to a second aspect, there is provided a method of transmitting data between a source node and destination node according to claim 17.

Embodiments of this method preferentially select the currently active path with highest loss rate for transmitting redundant packets such as forward error coded (FEC) coded packets, retransmissions or ARQ (Automatic Repeat-reQuest) coded packets.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 3:
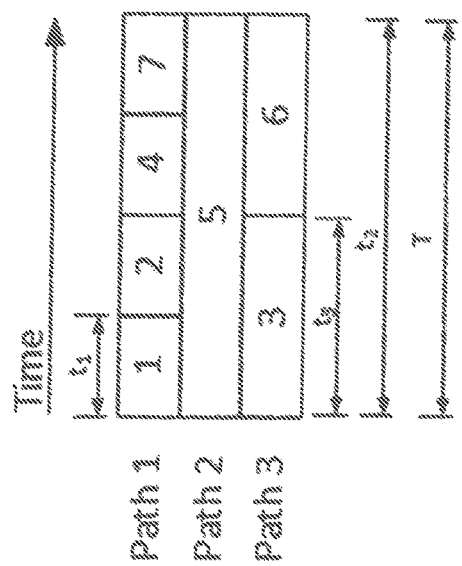
FIG. 3 illustrates the scheduling of packets for a frame including 7 packets and where a first path has 4 transmission slots, a second path has one transmission slot, and a third path has two transmission slots.

Referring now to FIG. 3, a source node divides a stream of packets which are to be transmitted to a destination node into successive frames, each frame including a set of N packets. On the one hand, it is desirable to make frames larger and so increase N, the number of packets per frame, for example, to allow for increased flexibility with scheduling. However, as will be appreciated from the description below, increasing N also places a higher processing burden on the source node to determine the optimal assignment of packets to network paths for transmission. In some embodiments N=7, however, it will be appreciated that this can increase or decrease according to the processing power available at a source node and depending on the optimisations employed in implementing embodiments.

Each of the paths through which the packets of a frame are to be transmitted are divided into a number of slots, each slot for transmitting a given packet of a frame. $t_k$ is designated as the amount of time required by the interface to transmit a packet in path k (transmission delay). For the purposes of illustration, in FIG. 3, an exemplary source node can communicate with a destination node across three network paths: Path 1 is the fastest path and so comprises the greatest number of transmission slots, Path 3 next fastest and Path 2 is the slowest with only 1 transmission slot, i.e. $t_1 < t_3 < t_2$.

It will be appreciated that in practical implementations, transmission times $t_k$ for paths need not be multiples of one another and so the total time for packets for a frame to be transmitted through one path may differ from the total time for other packets of the frame to be transmitted through another path.

In the simple example of FIG. 3, packets 1, 2, 4 and 7 are shown as being transmitted in sequence in the transmission slots of Path 1. Packet 5 is transmitted in the single transmission slot for Path 2; and packets 3 and 6 are transmitted in the two transmission slots for Path 3.

The problem however is to decide which packets are transmitted along which path and in what order so that in-order delivery delay is minimized, taking into account the uncertain, time-varying nature of the delay on each path.

Embodiments are based on modelling the transmission delay $t_k$ through a network path k as a random variable. So for example, where transmission delay is modelled as a Gaussian random variable, the expected transmission delay can be modelled with an average delay $\bar{t}_k$ and variability can be modelled as a variance $\sigma_{t_k}^2$ for each network path k.

Once each path is modelled, and this model can be updated periodically or from frame to frame or based on any other criteria such as the addition or subtraction of a path, then for each frame, the set of N packets of the frame are assigned or allocated to the different slots s in the paths k by determining a scheduling choke x, i.e. a particular assignment of packets to transmission slots for a frame, out of a set D of possible scheduling chokes that minimizes the sum of the expected in-order delivery times:

$$\min_{x \in D} \sum_{p=1}^{N} E[d_p]$$

where $E[d_p]=E[a_p+r_p]$ is the expected time packet p will be delivered to the application (which will only happen once packet p has been received and packets 1 to p−1 have been delivered to the application). We denote by $a_p$ the arrival time of packet p to its destination, and by $r_p$ the additional reordering delay of packet p, that is, the amount of time packet p has to wait for packets 1 to p−1 to be delivered to the application after the arrival of packet p.

In one embodiment, each scheduling choke $x=\{x_{1,1,1}, \ldots, x_{p,k,s}, \ldots, x_{P,K,S}\}$ is modelled as a vector of size N·K·S where S is the maximum number of slots contained within a path in the current frame. Each element of this vector is a binary variable such that $x_{p,k,s}=1$ if packet p is scheduled in path k and slot s and $x_{p,k,s}=0$ otherwise. This optimization problem can have additional constraints to avoid unfeasible or undesirable scheduling chokes:

1. $\sum_{p=1}^{N} x_{p,k,s} \leq 1, \forall k, \forall s$ so that we guarantee that one packet is sent within one slot.
2. $\sum_{k=1}^{K} \sum_{s=1}^{S} x_{p,k,s}=1, \forall p$ so at most one copy of each packet p is scheduled in a sot.
3.

$$x_{p,k,s} = 0, \forall k, \forall p, \forall s > \frac{T}{t_k} = 0,$$

so that we guarantee that no packets are scheduled in non-existent slots.

Let us analyse the expected reordering delay of a packet, assuming we know the arrival of each packet at the receiver. The first packet p=1 will be delivered straight to the application upon its arrival as it does not have to await for prior packets, i.e.:

$$d_1 = a_1 + r_1 = a_1.$$

The second packet p=2 will be delivered to the application once it arrives and once packet 1 has been delivered to the application, i.e.:

$$d_2 = a_2 + \max\{0, d_1 - a_2\} = a_2 + \max\{0, a_1 - a_2\}.$$

Similarly, for p=3, $$d_3 = a_3 + \max\{0, d_2 - a_3\} = a_3 + \max\{0, a_2 + \max\{0, a_1 - a_2\} - a_3\} =$$

$$= a_3 \max\{0, \max\{a_2, a_1\} - a_3\}.$$

Thus, the re-ordering delay for packet p, given schedule x, can be computed by $$r_p = \max\{0, \max\{a_1, a_2, \ldots, a_{p-1}\} - a_p\} \quad (1)$$

and the optimization problem becomes:

$$\min_{x \in D} \sum_{p=1}^{N} E[a_p] + E[\max\{0, \max\{a_1, a_2, \ldots, a_{p-1}\} - a_p\}] \quad (2)$$

The solution to this non-linear problem yields provides an optimal scheduling/assignment of packets to path slots for a frame.

Where transmission delays $t_k$ for respective paths k are modelled as Gaussian random variables with average delay $\bar{t}_k$ and variance $\sigma_{k_k}^2$ respectively, each of the expected packet arrival times $E[a_p]$ can be computed as follows:

$$E[a_p]=\Sigma_{k=1}^{K}\Sigma_{s=1}^{S}(E[T_k]+s\cdot\bar{t}_k)\cdot x_{p,k,s} \quad (3)$$

$E[T_k]$ is an expected propagation delay of a packet through the network path k. Again this can be modelled as a random variable.

So if in a given assignment, a packet is scheduled in the $3^{rd}$ transmission slot for a path k, then its expected arrival time will be $E[T_k]+3\cdot\bar{t}_k\cdot 1$, as the value of $x_{p,k,s}$ will be 0 for all other slots of the assignment.

However, as will be understood, computing $E[r_p]=E[\max\{0, \max\{a_1, a_2, \ldots, a_{p-1}\}-a_p\}]$, by calculating the maximum of the averages of 2 or more Gaussian variables does not necessarily produce the most accurate of results. Thus, embodiments of the invention based on a Gaussian model of transmission delay can be optimized to avoid such inaccuracies.

One technique for improving the accuracy of the calculation for $E[r_p]$ involves excluding some of the components from the set $A_p=\{a_1, a_2, \ldots, a_{p-1}\}$ used to determine $E[r_p]$ to provide an accurate approximation $\bar{r}_p$ of the expected reordering delay $\bar{r}_p\approx E[r_p]$ caused by scheduling choice x. This can be done as follows:

1. The function to be approximated, $E[\max\{0, \max\{a_1, a_2, \ldots, a_{p-1}\}-a_p\}]$, involves computing the maximum over a set of p-1 Gaussian random variables, i.e. computing $\max\{A_p\}=\max\{a_1, a_2, \ldots, a_{p-1}\}$. In order to obtain a more accurate but still computationally efficient approximation, we reduce the set $A_p=\{a_1, a_2, \ldots, a_{p-1}\}$, by removing those random variables that have some correlation with $a_p$, or that won't cause re-ordering actions to $a_p$. Thus, we remove all those elements $a_i$ when at least one of the following conditions are satisfied:

$x_{p,k,s_p}=x_{i,k,s_t}=1$, $\forall k$, $\forall i, <p, \forall s_i<s_p$: This removes from the set all packets i scheduled prior to p over the same interface as p, which we assume won't cause re-ordering delay and remove dependencies within the set.

The arrival of packet i<p is statistically unlikely to occur before packet p; for instance $E[a_i]+3\sigma_{a_i}<E[a_p]-3\sigma_{a_p}$, $\forall i<p$: This removes those arrivals scheduled well before p's, so the arrival of a packet prior to p, won't arrive after p with high probability.

This method, that yields a smaller set $\hat{A}$, helps to improve the accuracy of the approximation of $E[r_p]$ at a reasonable computational cost.

2. Even with the smaller set $\hat{A}$, a simple comparison of the averages of the remaining variables does not necessarily provide the most accurate or efficient result. In still further optimised embodiments, we find a Gaussian random variable $\varphi$ which approximates $\max\{\hat{A}\}-a_p$, i.e. $\varphi\approx\max\{\hat{A}\}-a_p$. This can be done using the Partition Max Binary Tree algorithm disclosed in D. Sinha, H. Zhou, and N. V. Shenoy, "Advances in computation of the maximum of a set of gaussian random variables," Computer-Aided Design of Integrated Circuits and Systems, IEEE Transactions on, vol. 26, no. 8, pp, 1522-1533, 2007. Here, the smaller set $\hat{A}=\{a_m, a_n, \ldots\}$ produced above is randomly partitioned into two subsets. The subsets are further partitioned into another two subsets, and this is repeated recursively until the subsets have two elements (or less): $a_m$ and $a_n$. We then find a Gaussian random variable with the same average and variance as $\max\{a_m, a_n\}$ for all subsets and propagate the approximation backwards until the root of the tree is reached resulting in a Gaussian random variable that approximates $\max\{\hat{A}\}$. We then subtract $a_p$ as per equation (1) above, resulting in $\varphi\approx\max\{\hat{A}\}-a_p$.

Now $r_p\approx E[\max\{0,\varphi\}]$ can be solved analytically and used along with an estimate of arrival time $E[a_p,]$, for example as from equation (3) above, to determine the delay for a scheduling choice as per equation (2). Thus, we can compute $\Sigma_{p=1}^{N}E[d_p]$ for any scheduling choice x.

It will be appreciated that while the above example has been described in terms of modelling arrival time using a Gaussian distribution, path delay can be also modelled, for example, using a Poisson or exponential distribution. Alternatively, discrete valued distributions can be employed to reflect situations where the transmission delay switches randomly between one of a number of discrete transmission delay values.

In any case, it will be appreciated that determining the minimum delay among a large set of possible assignment choices x could become computationally unfeasible with increasing frame size, as the processing overhead would by default be of the order of NI.

Thus, in some embodiments, in order to increase N, but for computation to remain feasible in any given source node, a smaller set of schedule choices than all possible choices is employed. First, we enumerate from 1 to N all the slots contained hi a frame and re-define a schedule choice as $y=\{m_1, m_2, \ldots, m_N\}$ where $m_i$ is the packet scheduled in slot i. In this way, all possible scheduling choices are represented by all the permutations of the set $\{1, 2, \ldots, N\}$.

A pruning-tree algorithm can construct all the permutations of assignment of packets to slots, recursively, by building a tree where each branch (from root to leave) corresponds to a schedule choice y. The algorithm then prunes branches (schedule choices) as it constructs them whenever it detects that such choice will be likely to cause high re-ordering delay. In this way, execution time is substantially reduced because those branches that would grow from the pruned branch are not created nor checked, and a smaller set of choices D is created, alleviating the computational burden of the inspection of the solver. In this way, we prune a branch if one of the following conditions is satisfied:

$x_{i,k,s_p}=x_{p,k,s_i}=1$, $\forall k$, $\forall i<p, \forall s_i<s_p$: This avoids that a packet p is scheduled before packet i<p in the same path which will surely cause re-ordering delay (note that we may benefit in doing so if it is done over different path).

Any assignment in which packet i<p arriving before packet p is statistically unlikely. For instance, $E[a_i]-3\sigma_{a_i}>E[a_p]+3\sigma_{a_p}$, $\forall i<p$: We avoid that any packet p is scheduled long before packet i<p, for any path, when the probability of benefiting from doing so is marginal (i.e., when it is practically impossible that packet i<p could be delivered before packet p.)

Figure 5:
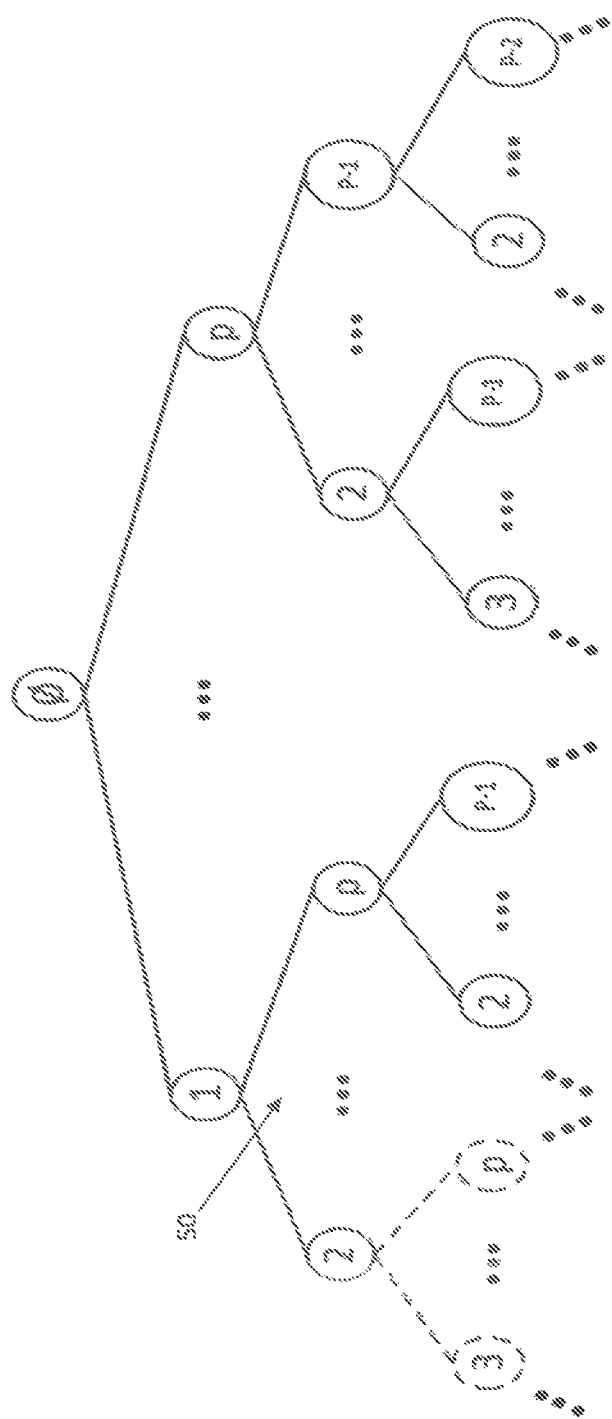
FIG. 5 illustrates a pruning-tree algorithm employed in certain embodiments.

An example is given in FIG. 5. In this example, allocating packet 1 in the first slot, and packet 2 in the second slot is found to cause high re-ordering delay (line 50). This may happen when slot corresponds to a much slower path than slot 2's. Thus, all the branches hanging from this one (in dashed lines) won't be created and the algorithm will move on to other branches.

An extreme variant of tree pruning, which further increases efficiency, is to employ a simple greedy scheduling approach whereby each packet p is transmitted on the path which minimises $E[d_p]$ (that is, rather than jointly scheduling packets so as to explicitly minimize $\Sigma_{p=1}^{N}E[d_p]$). Under certain conditions, such a greedy scheduling approach can in fact be optimal for the joint scheduling task and so minimize $\Sigma_{p=1}^{N}E[d_p]$.

Turning now to a second aspect of this invention, it is known to transmit redundant information within a data stream in an attempt to mitigate delay caused by a receiver potentially waiting for re-transmission of lost packets. Standard coding approaches make use of bock codes, whereby information packets are grouped into blocks (frames) and coded packets including the required redundant information are generated separately for each block (frame). Coded packets can be used to recover from loss of information packets within the same block.

In any case, recovery from lost information packets requires the receiver to wait for receipt of the coded packets from which the information packet can be reconstructed. This means that when multiple paths are used, re-ordering of coded packets, blocks and of packets across blocks can also contribute to in-order delivery delay.

Figure 1:
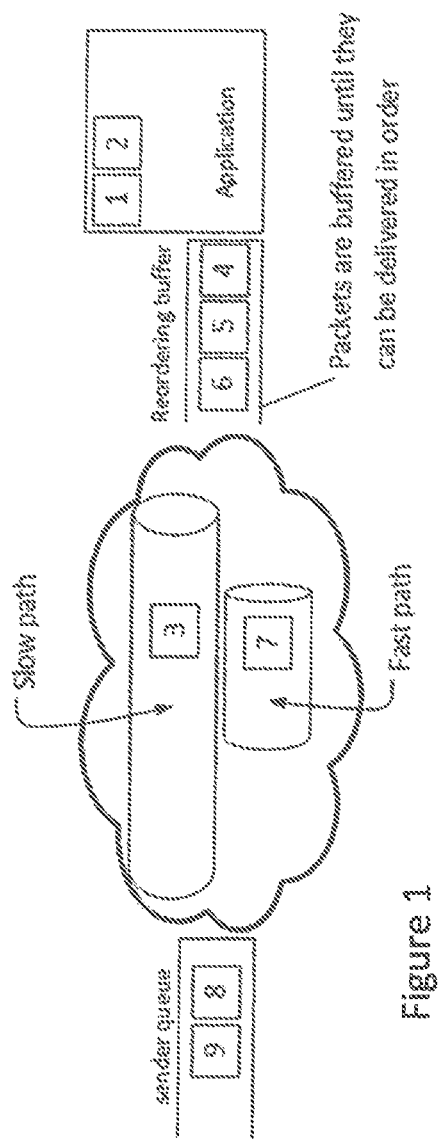
FIG. 1 illustrates packet re-ordering due to differences in path transmission time.
Figure 2:
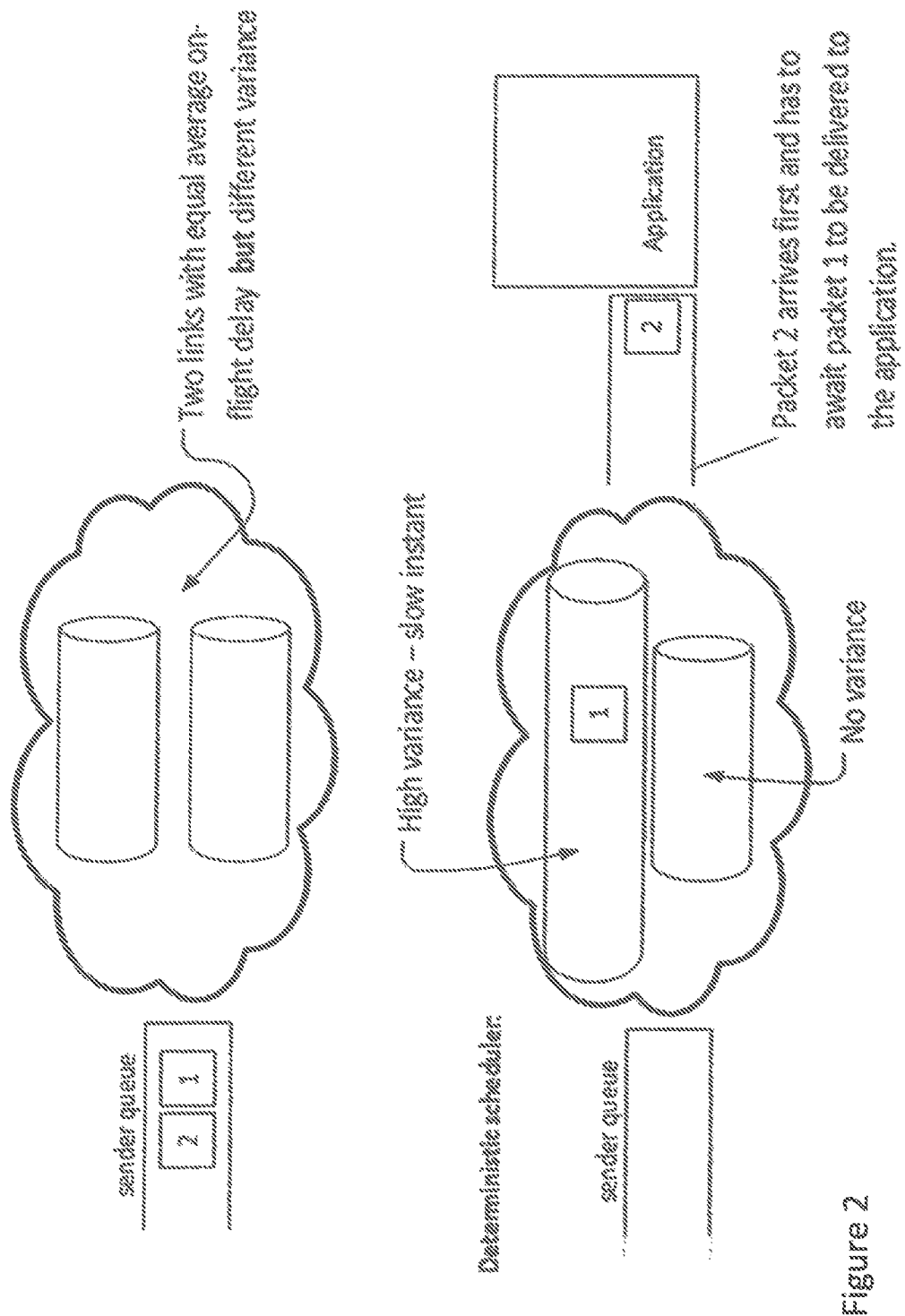
FIG. 2 illustrates how a deterministic scheduler can lead to re-ordering delay.
Figure 4:
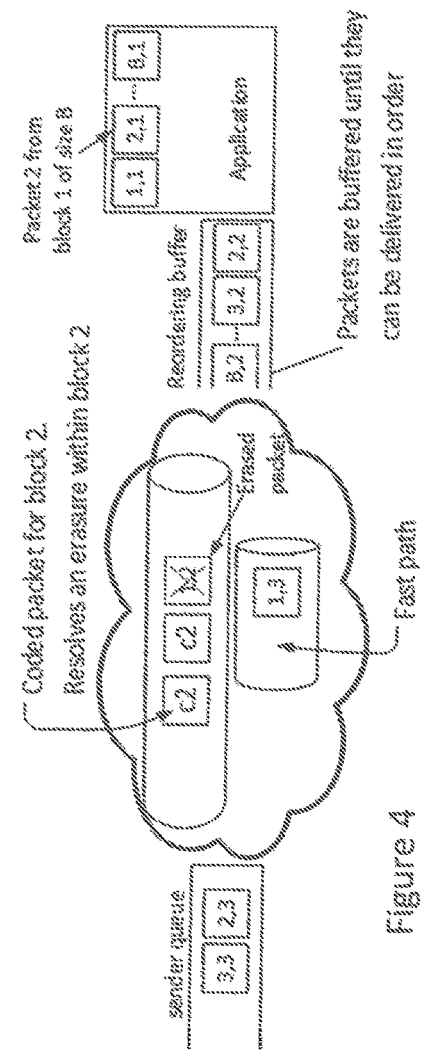
FIG. 4 illustrates the impact of re-ordering on a lossy path where a block code is used.

This is illustrated in FIG. 4 where the delivery of packets from bock 3 is delayed until all packets from block 2 have been successfully decoded. Due to packet loss, this delay may be B packets or more, where B is the block length in packets.

In one multi-path embodiment of the present invention, the source node determines a packet loss rate for each network path. The source node preferentially schedules the transmission of coded packets through the available network path with the highest loss rate. This means that in the set of assignment choices x or y referred to above available for consideration by the source node, only assignment chokes in which packets containing redundant data are transmitted in the available path with the highest loss rate are considered. This is based on the observation that if information packets are less likely to be lost, coded packets can be lost as they are less likely to be needed.

As well as variants mentioned above, other variations are possible. As mentioned above, the total amount of time required by the interface to transmit the packets for a frame in one path k (transmission delay) may differ from other paths. If there were to be a significant difference in times, then if a source were to wait until a common start time to transmit the packets for a subsequent frame, this could adversely affect the latency of the system.

Thus, in still further variants of the system, equations such as equation (3) referred to above for determining an expected arrival time of packets can be extended to take into account a variable start time for packets of one frame, as a function of varying completion times for the packets of previous frames, i.e. it may be possible to take into account an expected earlier availability to transmit through one path than another in determining the slots available for scheduling as well as the packets to be assigned to those slots. In this case, the expected arrival time of a packet from a frame $a_p$ could be modelled as:

$$E[a_p] = E[\Sigma_k \Sigma_s (T_k + s \cdot t_k) \cdot x_{p,k,s} + \Delta k]$$

where $\Delta k$ is the relative start time for transmitting packets for a given frame in a path k based on differences in expected finishing times for transmitting the packets for a previous frame across the multiple paths k.

Finally, it will be seen that in modelling the behaviour of any network path, a measure of variability is employed. In some implementations, this measure of variability could be combined with a risk factor. In a simple example, rather than using 3 sigmas in tree pruning or for calculating expected delay, 2 or less sigmas could be employed. If the risk factor is set higher, then the scheduling choices might be modified such that in some cases lower latency tends to be achieved, although this may come at the cost of increased risk of unexpected delays, for example, if a path behaved more variably than expected, in such embodiments, this risk factor could be set and possibly varied by a user to achieve better operating results according to their preferences and operating environment.

In any case, it will be appreciated that embodiments of the present invention behave at least as well as a deterministic scheduler in the event that variability of transmission delay is zero, but improve performance in the light of such variability.

The invention claimed is:

1. A method of transmitting data between a source node and destination node connected via multiple paths of a heterogeneous network, said method comprising:
   dividing said data into frames, each frame comprising a number of packets N, where, at the destination node, processing of an information packet p of said frame is conditional on receipt of the data for any information packet i of said frame where i<p;
   allocating, for each network path k, a number of sequential transmission slots s, each for transmitting a given packet p of said frame;
   providing a set D of possible assignments x of packets to transmission slots for a frame;
   determining an assignment x based upon an in-order delivery delay of said packets; and
   transmitting said packets in accordance with said determined assignment x.

2. The method of claim 1 wherein determining an assignment x based upon in-order delivery delay of the packets comprises determining an assignment x based upon minimum in-order delivery delay of said packets in accordance with:

$$\min_{x \in D} \sum_{p=1}^{N} E[a_p] + E[r_p]$$

where:
   $E[a_p]$ is an expected arrival time of packet p to its destination:

$$E[a_p] = \sum_{k=1}^{K} \sum_{s=1}^{S} (E[T_k] + s \cdot \overline{t_k}) \cdot x_{p,k,s}$$

where:
   $T_k$ is a propagation delay of a packet through the network path k;
   $x_{p,k,s} = 1$ if, in a given assignment x, a packet p is to be transmitted in a transmission slot s of network path k; and 0 otherwise;
   $t_k$ is a transmission delay for transmitting a packet in network path k; and
   $E[r_p]$ is an expected reordering delay for packet p:

$$E[r_p] = E[\max\{0, \max\{a_1, a_2, \ldots, a_{p-1}\} - a_p\}].$$

where:
   $r_p$ is the reordering delay of the packet p; and
   $a_p$ is the arrival time of packet p to its destination.

3. A method according to claim 2 comprising removing from consideration in the calculation of said expected reordering delay for a packet p of said frame, the expected arrival time of any packet i of said frame scheduled to be transmitted before packet p in the same network path k as packet p.

4. A method according to claim 2 comprising removing from consideration in the calculation of said expected reordering delay for a packet p of said frame, any packet i of said frame scheduled to arrive at said destination node substantially before packet p.

5. The method of claim 1 wherein determining an assignment x comprises determining an assignment x having a minimum in-order delivery delay of said packets.

6. The method of claim 1 wherein determining an assignment x based upon an in-order delivery delay further comprises determining an assignment x based upon at least one of: re-ordering of coded packets, blocks and of packets across blocks.

7. A method according to claim 1 comprising excluding from said set D of possible assignments any assignment in which a packet p of said frame is scheduled in the same path before a packet i of said frame where i<p.

8. A method according to claim 1 comprising excluding from said set D of possible assignments any assignment when it is statistically unlikely that a packet i<p could be delivered before packet p.

9. The method of claim 1 wherein:
at least one of the packets includes redundant data; and
providing a set D of possible assignments x of packets to transmission slots for a frame comprises preferentially scheduling packets including redundant data in the available network path having a highest packet loss rate.

10. A method according to claim 1 comprising assigning each packet of a frame to only one transmission slot.

11. A method according to claim 1 wherein at least one of said packets comprises redundant data.

12. A method according to claim 11 comprising preferentially scheduling packets comprising redundant data in an available network path having a highest packet loss rate.

13. A method according to claim 1 where the transmission delay on a path k depends on the average amount of time required by a source node to transmit a packet in path k.

14. A method according to claim 1 where the transmission delay on a path k depends on the average amount of time it takes a packet p to be transmitted from source to destination and the average amount of time required by a source node to transmit a packet in path k.

15. A method according to claim 1 where one or both of a start time or end time for transmitting packets for a frame through one path differs from the start time or end time for transmitting packets for the frame through others of said multiple paths.

16. A method according to claim 1 comprising periodically determining which of said multiple paths has the highest packet loss rate.

17. The method of claim 1 wherein determining an assignment x based upon in-order delivery delay of the packets takes into account re-ordering delays.

18. A network node arranged to communicate with one or more destination nodes across a communication network, the network node comprising:
a network node processor configured to:
divide data into frames, each frame comprising a number of packets N, where, at the one or more destination nodes, processing of an information packet p of the frame is conditional on receipt of the data for any information packet i of the frame where i<p;
allocate, for each network path k, a number of sequential transmission slots s, each for transmitting a given packet p of the frame;
provide a set D of possible assignments x of packets to transmission slots for a frame;
determine an assignment x based upon in-order delivery delay of the packets; and
transmit the packets in accordance with the determined assignment x.

19. The network node of claim 18 further configured to:
divide data into frames with each frame comprising a number of packets N, wherein at least one of the packets includes redundant data; and
provide a set D of possible assignments x of packets to transmission slots for a frame by preferentially scheduling packets including redundant data in the available network path having a highest packet loss rate.

20. The network node of claim 18 further configured to determine an assignment x based upon in-order delivery delay of the packets by taking into account re-ordering delays.

21. The network node of claim 18 further configured to exclude from the set D of possible assignments any assignment in which a packet p of the frame is scheduled in the same path before a packet i of the frame where i<p.

22. The network node of claim 18 further configured to exclude from the set D of possible assignments any assignment when it is statistically unlikely that a packet i<p could be delivered before packet p.

23. The network node of claim 18 further configured to assign each packet of a frame to only one transmission slot.

24. A computer program product comprising a non-transitory computer readable medium storing computer readable code which when executed in a computing device is arranged to perform a method of transmitting data between a source node and destination node connected via multiple paths of a heterogeneous network by:
dividing the data into frames, each frame comprising a number of packets N, where, at the destination node, processing of an information packet p of the frame is conditional on receipt of the data for any information packet i of the frame where i<p;
allocating, for each network path k, a number of sequential transmission slots s, each for transmitting a given packet p of the frame;
providing a set D of possible assignments x of packets to transmission slots for a frame;
determining an assignment x with in-order delivery delay of the packets; and
transmitting the packets in accordance with the determined assignment x.

25. The computer program product of claim 24 wherein:
at least one of the packets includes redundant data; and
providing a set D of possible assignments x of packets to transmission slots for a frame includes preferentially scheduling packets including redundant data in the available network path having a highest packet loss rate.

26. The computer program product of claim 25 wherein determining an assignment x based upon in-order delivery delay of the packets comprises determining an assignment x based upon minimum in-order delivery delay of said packets in accordance with:

$$\min_{X \in D} \sum_{p=1}^{N} E[a_p] + E[r_p]$$

where:
E[$a_p$] is an expected arrival time of packet p to its destination:

$$E[a_p] = \sum_{k=1}^{K} \sum_{s=1}^{S} (E[T_k] + s \cdot \overline{t_k}) \cdot x_{p,k,s}$$

where:
$T_k$ is a propagation delay of a packet through the network path k;
$x_{p,k,s}$=1 where, in a given assignment x, a packet p is to be transmitted in a transmission slot s of network path k; and 0 otherwise;
S is the maximum number of slots contained within a path in the current frame;
$t_k$ is a transmission delay for transmitting a packet in network path k; and E[$r_p$] is an expected reordering delay for packet p:

$$E[r_p] = E[\max\{0, \max\{a_1, a_2, \ldots, a_{p-1}\} - a_p\}].$$

where:
$r_p$ is the reordering delay of the packet p; and
$a_p$ is the arrival time of packet p to its destination.

27. The computer product of claim 26 further configured to remove from consideration in the calculation of said expected reordering delay for a packet p of the frame, the expected arrival time of any packet i scheduled to be transmitted before packet p in the same network path k as packet p.

28. The computer product of claim 26 further configured to removing from consideration in the calculation of said expected reordering delay for a packet p of the frame, any packet i of the frame scheduled to arrive at said destination node substantially before packet p.

* * * * *

UNITED STATES PATENT AND TRADEMARK OFFICE
CERTIFICATE OF CORRECTION

PATENT NO. : 10,541,932 B2  
APPLICATION NO. : 15/674021  
DATED : January 21, 2020  
INVENTOR(S) : Andrés Garcia Saavedra et al.

Page 1 of 1

It is certified that error appears in the above-identified patent and that said Letters Patent is hereby corrected as shown below:

In the Claims

Column 8, Line 44, Claim 2 delete "$E[a_p] = \sum_{k=1}^{k} \sum_{s=1}^{S} (E[T_k] + s \cdot \bar{t}_k) \cdot x_{p,k,s}$" and replace with -- $E[a_p] = \sum_{k} \sum_{s} (E[T_k] + s \cdot \bar{t}_k) \cdot x_{p,k,s}$ --

Column 8, Line 58, Claim 2 delete "."

Column 11, Line 6, Claim 26 delete "$E[a_p] = \sum_{k=1}^{K} \sum_{s=1}^{S} (E[T_k] + s \cdot \bar{t}_k) \cdot x_{p,k,s}$" and replace with -- $E[a_p] = \sum_{k} \sum_{s} (E[T_k] + s \cdot \bar{t}_k) \cdot x_{p,k,s}$ --

Signed and Sealed this  
Fifteenth Day of September, 2020

Andrei Iancu  
*Director of the United States Patent and Trademark Office*